(12) United States Patent
Templier et al.

(10) Patent No.: US 8,899,758 B2
(45) Date of Patent: Dec. 2, 2014

(54) OVERHEAD PROJECTOR WITH RETRACTABLE SCREEN

(75) Inventors: Francois Templier, Voiron (FR); Bruno Mourey, Coublevie (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 769 days.

(21) Appl. No.: 12/818,275

(22) Filed: Jun. 18, 2010

(65) Prior Publication Data

US 2010/0321642 A1  Dec. 23, 2010

(30) Foreign Application Priority Data

Jun. 19, 2009  (FR) ...................................... 09 54154

(51) Int. Cl.
  *G03B 21/06*  (2006.01)
  *G03B 21/58*  (2014.01)
(52) U.S. Cl.
  CPC ...................................... *G03B 21/58* (2013.01)
  USPC .......................................................... 353/66
(58) Field of Classification Search
  CPC ...................................................... G03B 21/58
  USPC .......................... 353/66, 79, 74; 359/443–461
  See application file for complete search history.

(56) References Cited

U.S. PATENT DOCUMENTS

| | | | | |
|---|---|---|---|---|
| 6,069,097 A | * | 5/2000 | Suzuki et al. | 442/328 |
| 6,083,583 A | * | 7/2000 | Klocek et al. | 428/182 |
| 2003/0020885 A1 | * | 1/2003 | Suzuki | 353/71 |
| 2006/0017887 A1 | * | 1/2006 | Jacobson et al. | 353/30 |
| 2006/0187544 A1 | | 8/2006 | Wiener et al. | |
| 2006/0234784 A1 | * | 10/2006 | Reinhorn | 455/575.1 |
| 2007/0091278 A1 | * | 4/2007 | Zakoji et al. | 353/79 |
| 2008/0163991 A1 | * | 7/2008 | Dettbarn et al. | 160/377 |
| 2009/0122400 A1 | | 5/2009 | Adams et al. | |

FOREIGN PATENT DOCUMENTS

| | | |
|---|---|---|
| GB | 399931 | 6/1932 |
| WO | 2008/030960 A2 | 3/2008 |
| WO | 2008/059345 A2 | 5/2008 |
| WO | 2009/064438 A1 | 5/2009 |

OTHER PUBLICATIONS

Kim et al. "Materials and Noncoplanar Mesh Designs for Integrated Circuits with Linear Elastic Responses to Extreme Mechanical Deformations" PNAS, 105(48): 18675-18680 (2008).

* cited by examiner

*Primary Examiner* — Thanh Luu
*Assistant Examiner* — Danell L Owens
(74) *Attorney, Agent, or Firm* — Occhiuti & Rohlicek LLP

(57) ABSTRACT

This overhead projector comprises:
  a screen (4) equipped with a frame and a translucent panel tautened on this frame, the translucent panel having a front face (20) on which the images are displayed and a rear face (8) on which the images are projected, the screen (4) being capable of being shifted between a retracted position and a stretched position in which the surface area of the panel is increased by at least 10% relatively to the surface area of the panel in its retracted position
  an apparatus (5) for projecting images on the rear face of the translucent panel this apparatus (5) being capable of adapting the size of the projected images to the retracted position as well as to the stretched position of the screen.

13 Claims, 2 Drawing Sheets

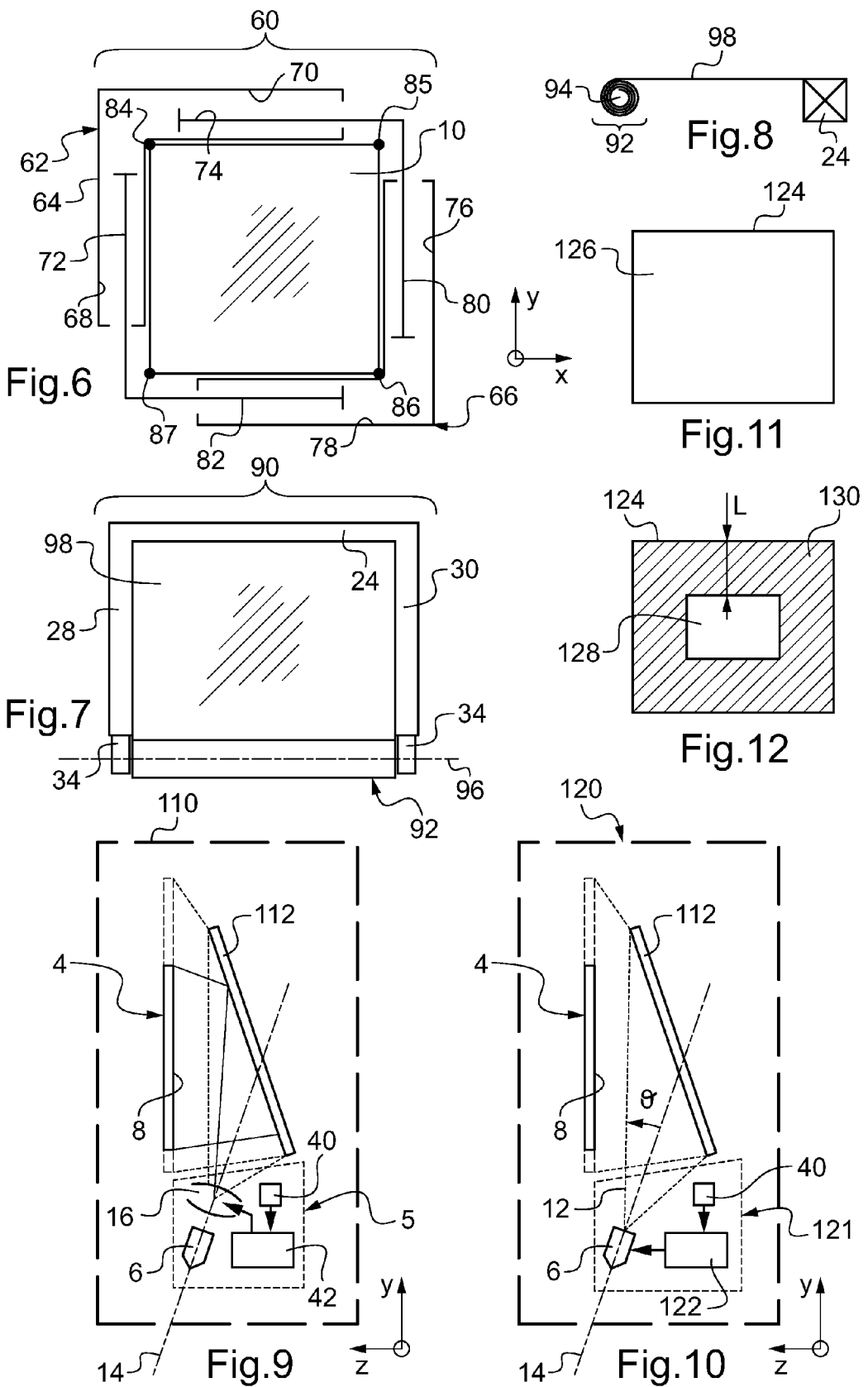

OVERHEAD PROJECTOR WITH RETRACTABLE SCREEN

CROSS-REFERENCE TO RELATED APPLICATIONS

This application claims the priority of French Application No. 0954154, filed on Jun. 19, 2009. The contents of the application are hereby incorporated by reference in their entirety.

BACKGROUND OF THE INVENTION

The invention concerns an overhead projector.

A prior-art overhead projector comprises:
- a screen equipped with a frame and a translucent panel tautened on this frame, the translucent panel having a front face on which the images are displayed and a rear face on which the images are projected, and
- an apparatus for projecting images on the rear face of the translucent panel.

The term "overhead projector" herein designates apparatuses in which the image becomes directly visible to the spectator after having crossed the translucent panel. These overhead projectors are different from apparatuses in which the image is projected on an opaque screen. Indeed, in the latter case, the projected image can be seen by the spectator only after it has been reflected on the opaque screen.

Here, the term "translucent panel" designates a panel which disseminates, on its front face side, the image projected on its rear face so as to make it directly perceptible to a human being placed before this panel. To this end for example, the panel has agents scattering light such as to prompt an angular aperture of the light beam projected on its rear face when this beam crosses the panel. This angular aperture of this beam is for example prompted by multiple diffractions.

There are numerous applications for overhead projectors. For example, the overhead projectors are used as a television set.

These overhead projectors may have a large screen, which is appreciated by users. The trade-off is that the large size of the screen makes the overhead projector difficult to transport.

SUMMARY OF THE INVENTION

The invention is aimed at overcoming this drawback by proposing an overhead projector that is far easier to transport.

An object of the invention therefore is an overhead projector in which:
- the screen can be shifted between a retracted position and a stretched position in which the surface area of the panel is increased by at least 10% relatively to the surface area of the panel in its retracted position, and
- the projection apparatus is capable of adapting the size of the projected images to the retracted position as well as to the stretched position of the screen.

The possibility of modifying the size of the screen makes it possible for example to reduce the size of the screen when it has to be carried and hence to diminish the overall space requirement of the overhead projector. On the contrary, the screen may be enlarged when the overhead projector is not transported. Thus, this overhead projector preserves the advantages of existing overhead projectors and is, at the same time, easier to transport.

Furthermore, the possibility of projecting images on the screen in its retracted position as well as its stretched position offers the user the possibility of new functions. For example, instead of zooming into a detail of the image to magnify this detail, the user can magnify the entire image by magnifying the size of the screen. Conversely, the user can decide to reduce the size of the images by reducing the size of the screen for mobile use such as in public transport.

The embodiments of this overhead projector may comprise one or more of the following characteristics:
- the panel is made out of a stretchable material whose breaking point is at least greater than 10% and preferably greater than 30%;
- the stretchable material has a Young's modulus of less than 5 GPa and preferably less than 2 GPa;
- the projection apparatus has a device for adjusting the aperture angle of a light beam projecting images on the rear face of the panel to adapt the size of the projected images to the position of the screen;
- the projection apparatus has a device for processing the initial image to be projected capable of generating a new image to be projected containing a reduction of the initial image surrounded by a band designed to be projected outside the periphery of the rear face of the panel, the width of the band being adjustable to match the size of the reduction to the position of the screen;
- the aperture angle of the light beam projecting the images on the rear face of the panel is constant whatever the position of the screen;
- the overhead projector has a sensor of the position of the screen and the projection apparatus is capable of automatically matching the size of the image to the position of the screen as a function of the position measured by this sensor;
- the overhead projector has a mechanism for locking the position of the screen in at least one intermediate position between the retracted position and the most stretched position.

These embodiments of the overhead projector furthermore have the following advantages:
- using a stretchable panel enlarges the screen without any need to use a winding mechanism or any other mechanism of this type to wind or unwind the panel;
- using a stretchable material with a low Young's modulus, i.e. a Young's modulus of less than 5 GPa, reduces the force that must be exerted by the user to enlarge the screen;
- using a device for adjusting the aperture angle of the light beam adapts the size of the image to the position of the screen;
- using a device for processing the initial image to be projected averts the need to use an optical device for adjusting the aperture angle of the light beam projecting the image;
- keeping the angle of aperture of the light beam that projects the images constant simplifies the making of the overhead projector;
- automatically adapting the size of the images to the position of the screen facilitates the use of the overhead projector.

BRIEF DESCRIPTION OF THE DRAWINGS

The invention will be understood more clearly from the following description, given purely by way of a non-restrictive example and made with reference to the appended drawings of which:

FIG. 6 is a schematic illustration of a screen that can be stretched in two orthogonal directions;

FIGS. 7 and 8 are schematic illustrations respectively in a top view and in cross-section of another embodiment of an overhead projector provided with an extendable screen;

FIGS. 9 and 10 are schematic illustrations of two other possible embodiments of an overhead screen equipped with an extendable screen; and FIGS. 11 and 12 are schematic illustrations of a cross-section of a light beam projecting images on the screen of the overhead projector of FIG. 10.

MORE DETAILED DESCRIPTION

In these figures, the same references are used to designate the same elements.

Here below in this description, the characteristics and functions well known to those skilled in the art shall not be described in detail.

Figure 1:
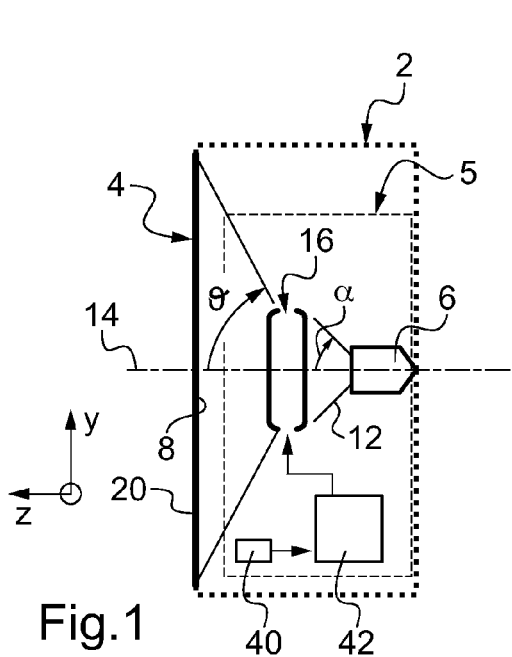
FIGS. 1 and 2 are schematic illustrations in a side view of an overhead projector in the retracted and stretched positions respectively.
Figure 2:
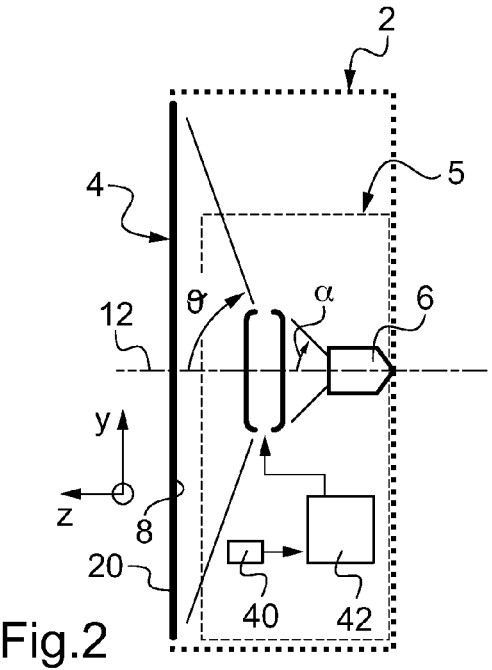
Figure 3:
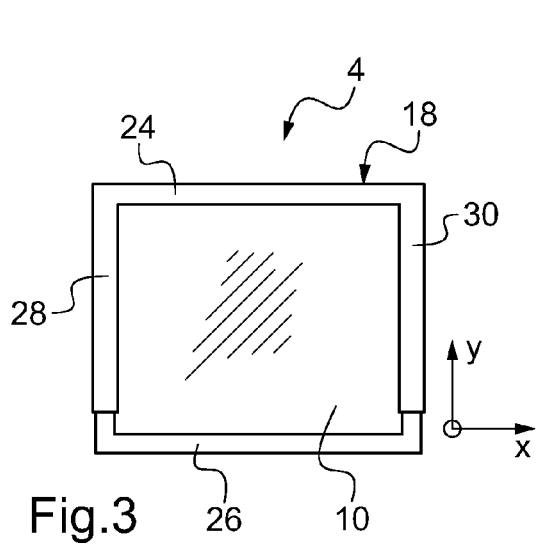
FIGS. 3 and 4 are schematic illustrations of a front view of a screen of the overhead projector of FIGS. 1 and 2 in the retracted and stretched positions respectively.

FIGS. 1 and 2 represent an overhead projector 2 equipped with a screen 4. This screen 4 extends in a plane parallel to a horizontal direction X and to a vertical direction Y. The directions X and Y are orthogonal. The screen 4 is represented in greater detail in FIGS. 3 and 4. In FIGS. 1 and 3, the screen is in the retracted position and in FIGS. 2 and 4 the screen is in a stretched position.

The overhead projector 2 has an apparatus 5 for projecting images on a rear face 8 of a translucent panel 10 of the screen 4. The images thus projected are designed to be directly viewed by the users on a front face 20 of this panel 10.

To this end, the apparatus 5 has a projector 6 and an optical device 16. The projector 6 generates a light beam 12 along an optical axis 14 with a constant aperture angle $\alpha$. The axis 14 extends in a direction Z perpendicular to the directions X and Y. The aperture angle $\alpha$ is the angle between the optical axis 14 and the ray at the greatest distance from the optical axis which enters the device 16. The device 16 is used to adjust the aperture angle of the beam 12. Here, the device 16 modifies the aperture angle $\alpha$ at an adjustable aperture angle $\theta$. The aperture angle $\theta$ is the angle between the optical axis 14 and the ray at the greatest distance from this optical axis which comes into contact with the periphery of the panel 10. The amplitude of the variation of the angle $\theta$ between the retracted position and the stretched position will be at least 10° and preferably at least 25°, 30°, 50° or 80°. The maximum value of the angle $\theta$ will for example be at least equal to 30° and preferably equal to 50° or 80°. Indeed, the greater the maximum value of the angle $\theta$, the greater is the possibility of a reduction in the space required by the overhead projector 2.

Similarly, to reduce the space requirement of the overhead projector 2, the projector 6 has the smallest possible dimensions. For example, the greatest dimension of the projector 6 is less than 3 cm and preferably less than 2 cm.

The projector 6 produces for example a luminance of the order of 10 lumens on a screen with 20 cm diagonal. The projector 6 can be made from an LCD transmissive or reflective screen or by other technologies such as technologies based on micro-mirrors or Micro-ElectroMechanical Systems (MEMS) illuminated by laser.

Figure 4:
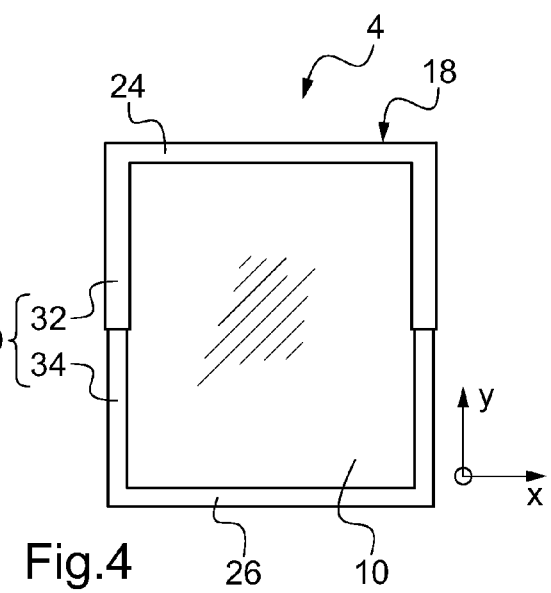

The screen 4 can be shifted from a retracted position shown in FIG. 3 to an stretched position shown in FIG. 4. To this end, the screen 4 has an extensible frame 18 on which the panel 10 is stretched. In this embodiment, the panel 10 is stretchable. To this end, the panel 10 is made out of a material whose breaking point is at least greater than 10% and preferably greater than 30%, 100% or 200%.

The breaking point is the maximum stretch in a given stretching direction which may be obtained before the panel tears or breaks. This limit is expressed by the difference between the length of the stretched panel and the length of the relaxed panel in the stretching direction, this difference being expressed in percentage of length of the relaxed panel.

The panel is also made out of an elastic material whose elasticity limit is equal to the breaking strength plus or minus 5%. Thus, the stretched panel can return to its relaxed position without undergoing permanent change in shape.

The Young's modulus of the material used to make the panel 10 is also low, i.e. it is below 5 GPa and preferably below 2 GPa. Thus, the force that the user must produce in order to stretch this panel remains low.

For example, the panel 10 is made out of an elastomeric material such as latex, polyurethane, neoprene, polyacrylic.

Here, the frame 18 is designed to stretch the panel in the direction Y alone. The panel 10 is therefore fixed without any degree of freedom firstly to a higher horizontal upright 24 and secondly to a lower horizontal upright 26 of the frame 18. These uprights 24 and 26 are spaced out from one another by telescopic vertical uprights 28 and 30. These uprights are laid out along the periphery of the panel 10.

The vertical uprights 28 and 30 may be deployed between the retracted position of FIG. 3 and the stretched position of FIG. 4. For example, to this end, the uprights 28 and 30 are identical and only the upright 28 shall be described here in greater detail. The upright 28 comprises a slideway 32 within which there slides a slider 34 along the direction Y. The upper end of this slider rail 32 is fixed without any degree of freedom to the upright 38 while the lower end of the slider 34 is fixed without any degree of freedom to the upright 26.

The apparatus 5 also has a sensor 40 of the position of the screen 4 and a unit 42 for controlling the device 16. The unit 40 automatically matches the angle $\theta$ to the measurement of the position of the screen 4 so that the size of the proposed image permanently occupies at least 90% and at most 100% of the surface of the face 8.

Figure 5:
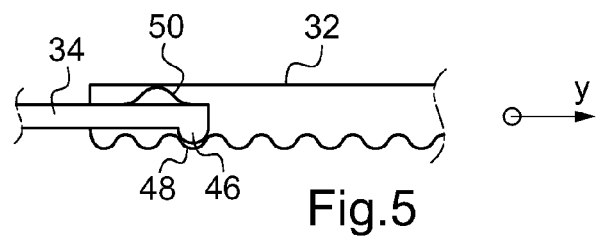
FIG. 5 is a schematic illustration of a mechanism for locking the position of the screen.

The frame 18 also has a mechanism for locking the screen in its retracted position, its stretched position and the many intermediate positions between these two end positions. An example of such a mechanism is shown schematically in FIG. 5.

The end of the slider 34 has a boss 46 capable of cooperating with the corresponding groove 48 formed in the slideway 32 to lock the position of the screen 4. Here, the slideway 32 has a succession of parallel grooves similar to the groove 48 along the direction Y. For example, the boss 46 is acted upon within the groove 48 by a blade spring 50. When the user moves the uprights 24 and 26 apart, the force that he or she exerts is sufficient to make the boss 46 pass from the groove 48 to the following groove. When the user stops exerting force, the spring blade 50 holds the boss 46 within a groove, providing for the locking of the position of the screen 4.

When it is being transported, the screen 4 of the overhead projector 2 is placed in its retracted position so as to reduce the space requirement of the overhead projector 2. In this position, the unit 42 automatically reduces the value of the angle $\theta$ so that the size of the projected image corresponds to the dimensions of the panel 10. When the user wishes it, he or she pulls on one of the uprights 24 or 26 so as to stretch the panel 10 until the desired position is reached. The sensor 40 then measures the new position of the screen 4 and transmits this piece of information to the unit 42 which automatically activates an increase in the angle θ so as to match the size of the image to the surface of the panel 10. Thus, the user can make" good use of the possibility of enlarging the screen 4 so as to enlarge the images viewed.

FIG. 6 shows another screen 60 which can be used instead of the screen 4. The screen 60 can be stretched simultaneously in the directions Y and X. This screen comprises a frame 62. The frame 62 is formed by two diagonally opposite squares 64 and 66. The square 64 comprises two slide rails 68, 70 arranged perpendicularly to each other. Sliders 72, 74 are mounted so as to slide respectively within slideways 68 and 70 along the directions X and Y.

Similarly, the square 66 comprises a vertical slide rail 76 and a horizontal slide rail 78 within which the sliders 80 and 82 are mounted in a sliding position.

The upper end of the slider 80 is fixed at right angles without any degree of freedom at the right-hand end of the slider 84. The far left of the slider 82 is fixed to the right angle without any degree of freedom at the lower end of the slider 72. The panel 10 is fixed to each angle of the frame 62 by attachment points 84 to 87. Thus, the screen can be enlarged by pulling on the squares 62 and 66 either in one of the two directions X and Y or in both directions at once.

FIGS. 7 and 8 show another screen 90 that can be used instead of the screen 4. This screen 90 is for example identical to the screen 4 except that the upright 26 is replaced by a winding mechanism 92 for a translucent panel 98.

The winding mechanism 92 comprises a roller 94 mounted rotationally about a horizontal shaft 96. To this end, each of the ends of the roller 94 is received in a corresponding bearing fixedly joined to a lower end of the slider 34. The end of the panel 98 is fixed by one side to the roller 94 and by the other side to the upright 24. This panel 98 is wound, for example in several turns, about the roller 94 when the screen is in its retracted position. Thus, when the upright 24 is at a distance from the roller 94, the panel 98 is unrolled and the surface of the screen is enlarged. In this embodiment, it is not necessary for the breaking strength of the panel 98 to be greater than 10% or for the panel 96 to have high elasticity. Preferably, the roller 94 is associated with elastic means used for stretching the panel 98 on the frame without any consumption of electrical energy.

FIG. 9 shows another embodiment of an overhead projector 110.

The overhead projector 110 is identical to the overhead projector 2 except that the optical axis 14 is tilted relative to the direction Z. For example, the angle between the axis 14 and the direction Y is equal to 0° plus or minus 45°.

To direct the light beam 12 to the face 8 of the screen 4, the overhead projector 110 has a mirror 112. Here, the mirror 112 is fixed relative to the axis 14.

In FIG. 9, the stretched position of the screen 4 is represented by dashes while its retracted position is represented by a continuous line. Similarly, the light beam projected on the screen 4 in the stretched position is represented by dashes while it is represented by a continuous line when the screen 4 is in its retracted position.

This layout of the projector 6 relative to the screen 4 limits the space requirement of the overhead projector 110 in the direction Z.

FIG. 10 shows another embodiment of an overhead projector 120. This overhead projector 120 is identical to the overhead projector 110 except for the fact that the device 16 has been omitted and that the apparatus 5 is replaced by an image-projection apparatus 121. The apparatus 121 is identical to the apparatus 5 except that the control unit 42 is replaced by an image-processing unit 122 capable of generating the images projected by the projector 6. In this embodiment, the aperture angle θ of the projected beam 12 is constant whatever the position of the screen 4. The cross-section of the beam 12 is constant. This cross-section is represented by a rectangle 124 in FIG. 11. The constant angle θ is chosen so that the beam 12 illuminates the totality of the face 8 after having been reflected on the mirror 112 when the screen is in its stretched position.

The unit 122 receives the initial image to be projected on the face 8 of the screen 4 and the measurements made by the sensor 40. If the measurement of the sensor 40 indicates that the size of the screen 4 has been modified, then the unit 122 processes the initial image so that it occupies more than 90% and at least 100% of the surface of the face 8. To this end, for example, the unit 122 reduces the image 126 so as to obtain a reduction 128 (see FIG. 12) of this image and surrounds it with bands 130 designed to be projected outside the face 8 of the screen 4. For example, the bands 130 are black bands.

Thus, as represented in FIG. 12, the reduction 128 occupies solely a central part of the cross-section 124. The dimensions of the reduction 128 are chosen so that this reduction 128 is projected on the rear face 8 while the bands 130 are projected outside the rear face 8. Thus, in this embodiment, it is not necessary to adjust the aperture angle θ. Instead, only the width L of the bands 130 is adjusted.

Many other embodiments are possible. For example, other mechanisms for extending the frame can be designed such that a frame in which the uprights 28 and 30 are replaced by uprights made out of an elastomer material.

Should the panel be stretchable in only one stretching direction, a mechanism can be provided in order to hold the edges of the panel and the uprights of the frame in contact in a direction parallel to this direction of stretching. This mechanism prevents or reduces the retraction of the panel in the direction perpendicular to this stretching direction.

Other locking mechanisms are also possible. For example, the locking of the frame in its retracted position or in its stretched position can be obtained by moving a pin or by means of a clamping screw. The locking mechanism determines the number of lockable positions of the screen. This number of positions may be limited to two extreme positions such as the retracted position and only one stretched position.

As a variant, the size of the projected image is adjusted manually by the user. In this case, the sensor 40 may be omitted.

The shifting of the frame between its retracted and stretched positions may be motor-driven by means of an electrical actuator controllable by the user.

The content of the image projected can also be modified as a function of the position of the screen measured by a sensor. For example, in the retracted position, the image is formed solely by an initial illustration which occupies the essential part of the surface of the panel. In the stretched position, the projected image comprises the same initial illustration complemented with complementary illustrations. For example, complementary illustrations are laid out in the additional part of surface of the panel which has appeared after the shift to the stretched position. Preferably, the dimensions of the initial illustration on the screen are the same in the retracted and stretched positions. Thus, a shift of the screen to its stretched position enables access to the complementary illustrations. This can be applied through consultation of a map of a downtown area or of a city suburbs. The initial illustration is the map of a downtown area only. The complementary illustrations are plans of the suburbs. In this application, shifting the screen from its retracted position to its stretched position enables the user to access more information, i.e. maps of suburbs.

The invention claimed is:

1. An overhead projector comprising: a screen equipped with a frame and a translucent panel tautened on the frame, the translucent panel having a front face on which the images are displayed and a rear face on which the images are projected, an apparatus for projecting images on the rear face of the translucent panel, wherein the screen can be shifted between a retracted position and a stretched position, wherein in the retracted position, the panel has a surface having a first value, wherein in the stretched position, as a result of having been stretched, the panel has a surface are having a second value, wherein the second value is greater than or equal to a sum of the first value and 10% of the first value, and wherein the projection apparatus is considered to adapt the size of the projected images in response to whether the screen is in the first position or the second position.

2. The overhead projector according to claim 1, wherein the panel is made out of a stretchable material whose breaking point is such as to permit the screen to stretch by at least greater than 10%.

3. The overhead projector according to claim 1, wherein the panel is made out of a stretchable material whose breaking point is such as to permit the screen to stretch by at least greater than 30%.

4. The overhead projector according to claim 2, wherein the stretchable material has a Young's modulus of less than 5 GPa.

5. The overhead projector according to claim 2, wherein the stretchable material has a Young's modulus of less than 2 Gpa.

6. The overhead projector according to claim 3, wherein the stretchable material has a Young's modulus of less than 2 Gpa.

7. The overhead projector according to claim 1, wherein the projection apparatus comprises a device for adjusting the aperture angle of a light beam projecting images on the rear face of the panel to adapt the size of the projected images to the position of the screen.

8. The overhead projector according to claim 1, wherein the projection apparatus comprises a device for processing the initial image to be projected, and for generating a new image to be projected, the new image containing a reduction of the initial image surrounded by a band designed to be projected outside the periphery of the rear face of the panel, the width of the band being adjustable to match the extent of the reduction to the position of the screen.

9. The overhead projector according to claim 8, wherein the aperture angle of the light beam projecting the images on the rear face of the panel is constant whatever the position of the screen.

10. The overhead projector according to claim 1, further comprising a sensor of the position of the screen and wherein the projection apparatus is capable of automatically matching the size of the image to the position of the screen as a function of the position measured by this sensor.

11. The overhead projector according to claim 1, further comprising a mechanism for locking the position of the screen in at least one intermediate position between the retracted position and a most stretched position.

12. The overhead projector according to claim 10, wherein the projection apparatus comprises an image-processing unit programmed to modify the content of the image projected on the rear face of the translucent panel as a function of the position of the screen measured by said sensor.

13. The overhead projector according to claim 1, wherein the image-processing unit is programmed to project, on the rear face of the translucent panel, in the retracted position, an initial illustration on a first part of the surface of the translucent panel, and to project, on the rear face of the translucent panel, in the stretched position, the initial illustration on the first part of the surface and a complementary illustration on a second part of the surface, the second part being different from the first part.

* * * * *